United States Patent
Ungchusri et al.

[11] Patent Number: 6,164,707
[45] Date of Patent: *Dec. 26, 2000

[54] STEP BEARING RACE SWIVEL JOINT ASSEMBLY

[75] Inventors: Tep Ungchusri, Woodlands; Sergio A. Castillo, Spring, both of Tex.

[73] Assignee: FMC Corporation, Chicago, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/742,520

[22] Filed: Nov. 1, 1996

Related U.S. Application Data

[63] Continuation of application No. 08/260,160, Jun. 15, 1994, abandoned.

[51] Int. Cl.[7] ............................................. F16L 27/04
[52] U.S. Cl. .......................... 285/276; 285/98; 384/512
[58] Field of Search .................................. 285/272, 276, 285/134, 136, 98, 145.1; 384/504, 512, 513, 516

[56] References Cited

U.S. PATENT DOCUMENTS

| | | | |
|---|---|---|---|
| 738,503 | 9/1903 | Waters | 285/276 X |
| 990,946 | 5/1911 | Badger | 384/513 |
| 1,325,113 | 12/1919 | Rohn | 384/512 |
| 1,452,603 | 4/1923 | Himes | 384/513 |
| 2,412,287 | 12/1946 | Phillips | 285/138 |
| 2,879,083 | 3/1959 | Corsette | 285/114 |
| 3,142,498 | 7/1964 | Press | 285/276 X |
| 3,372,715 | 3/1968 | Ashton | 285/134 X |
| 4,418,947 | 12/1983 | Talafuse | 285/168 |
| 4,501,511 | 2/1985 | Albert, Jr. | 403/24 |
| 4,930,791 | 6/1990 | Ungchusri et al. | . |
| 5,118,205 | 6/1992 | Hoffman | 384/512 X |
| 5,149,148 | 9/1992 | Taeuber, Jr. et al. | . |
| 5,160,229 | 11/1992 | Yoshino | 408/59 |
| 5,176,457 | 1/1993 | Hofmann et al. | 384/512 X |

FOREIGN PATENT DOCUMENTS

| | | | |
|---|---|---|---|
| 1907428 | 9/1970 | Germany | 285/276 |
| 127402 | 2/1950 | Sweden | 384/512 |
| 15984 | 8/1899 | United Kingdom | 384/512 |

*Primary Examiner*—H. Shackelford

[57] ABSTRACT

A fluid-carrying swivel joint has a stepped bearing race arrangement on interconnecting hubs having an improved bore seal capability. The stepped arrangement allows more ball bearings per adjacent race which allows equal distribution of hydrostatic end loading to each bearing race, thereby enabling maximum total end loading while minimizing load concentration on a particular bearing race section due to increased total ball and race contact area. A straight bore type seal is used to reduce surface area subject to axial pressure and to minimize rotational friction.

17 Claims, 3 Drawing Sheets

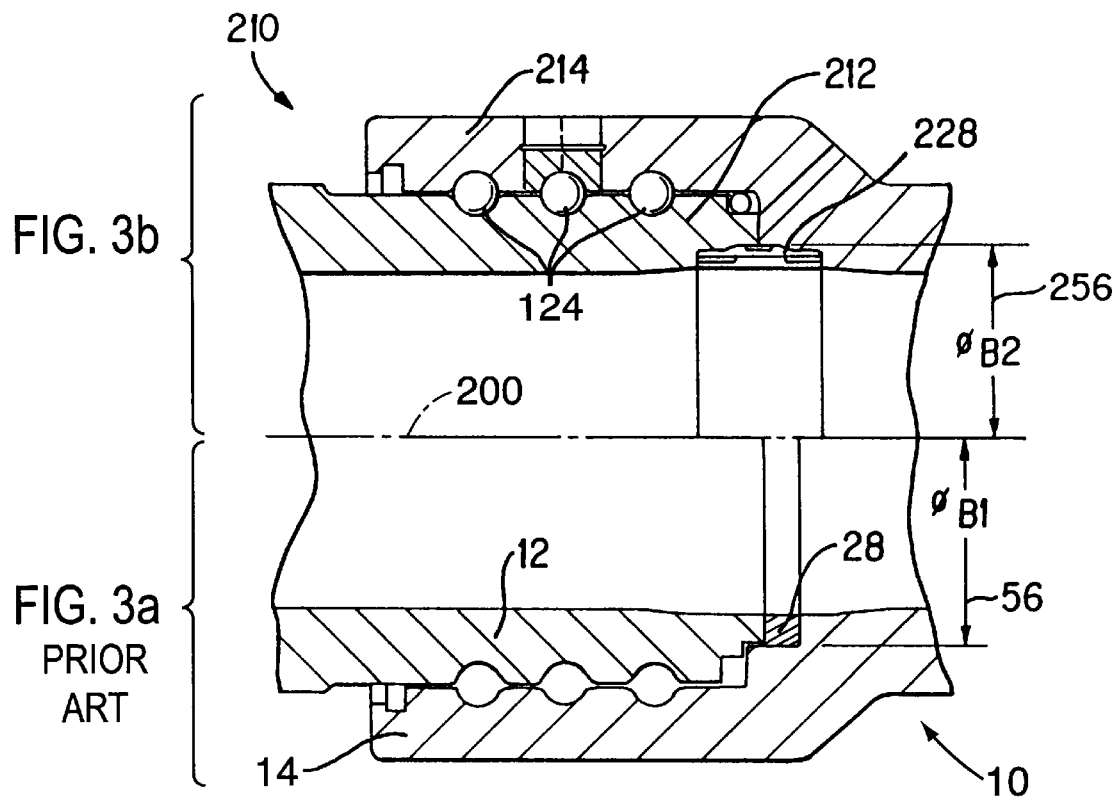
FIG. 3b
FIG. 3a
PRIOR ART
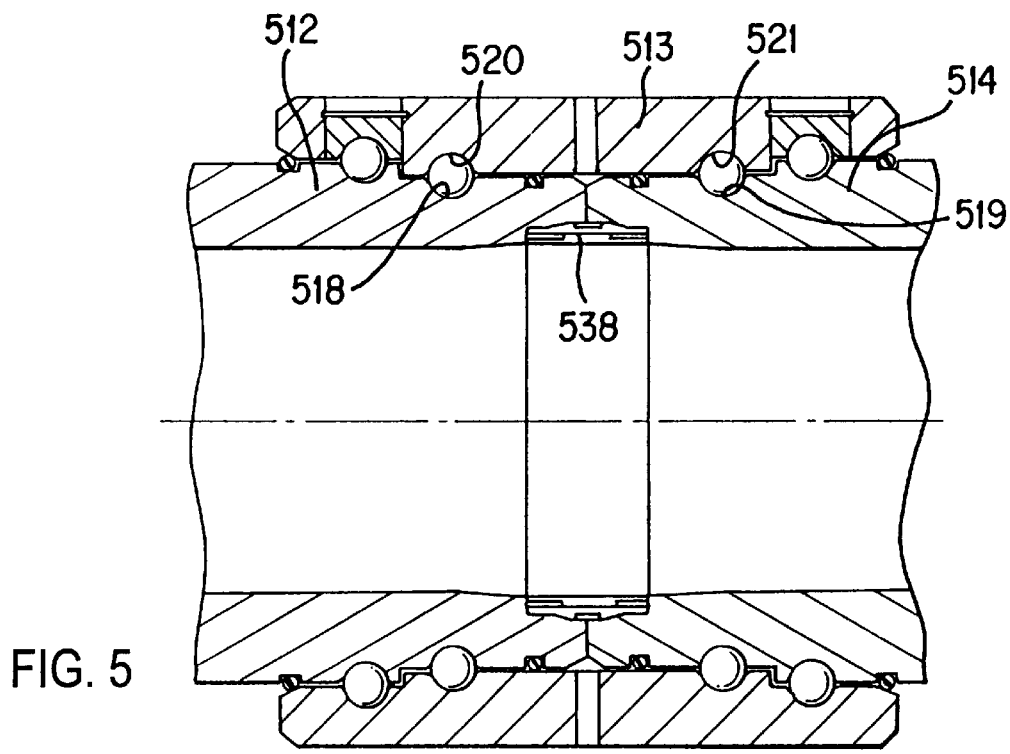
FIG. 5

STEP BEARING RACE SWIVEL JOINT ASSEMBLY

This application is a continuation of application Ser. No. 08/260,160, filed Jun. 15, 1994 abandoned.

BACKGROUND OF THE INVENTION

The present invention relates to a bearing assembly and, more particularly, to a bearing race assembly which can be used to accommodate relative swiveling between connected fluid pipes or conduits in a fluid swivel joint.

Swivel joints are used to connect fluid pipes in oilfields and in other applications. Swivel joints are generally comprised of interfitting male and female members rotatably interconnected by a bearing assembly. Typically, inner and outer grooves are incorporated in the male and female members to form a bearing race and a plurality of ball bearings are housed within the race. Higher demand for compatibility with increased service pressure, wider operating temperature range, and greater variety of corrosive chemicals has resulted in swivel joint designs with multiple bearing races rather than one bearing race. Even with multiple bearing races high pressures can sometimes cause deformation or brinelling of ball races. Such brinelling relaxes seal compression and causes the seal to leak, preventing the swivel joint from swiveling smoothly under pressure and reducing race life significantly. Swivel joints are subject to other modes of failure as well under such conditions.

SUMMARY OF THE PRESENT INVENTION

The present invention provides a multiple-race swivel joint bearing assembly for improved sealing under the above mentioned conditions having bearing races situated in a stepped relationship wherein each adjacent bearing race is positioned concentrically with respect to the next and has an incrementally greater radius than the next. The stepped configuration more equally distributes hydrostatic end loading to each bearing race section, enabling maximum total end loading while minimizing load concentration on a particular bearing race section. To further reduce end loading and improve sealing, a straight bore type seal is used to reduce surface area subject to axial pressure and to greatly reduce rotational friction associated with conventional pre-stress fitted elastomer compression seals. In addition, the present invention reduces brinelling of ball bearing races through an offset elongated radius configuration in race cross section enabling greater contact area between each ball bearing and race, reducing load concentration. The present invention improves sealing under extreme conditions and specifically eliminates ball race brinelling at pressures much greater than is attained with conventional or known swivel joints with minimal increase in weight and cost.

BRIEF DESCRIPTION OF THE DRAWINGS

FIG. 3A is an enlarged partial cross-section of the prior art assembly depicted in FIG. 1;

FIG. 3B is a partial cross-section of a second embodiment of the present invention having a straight bore seal;

FIG. 5 is a partial cross-section of a second embodiment of the present invention having a double-ended stepped, double-race bearing assembly.

DESCRIPTION OF THE PREFERRED EMBODIMENTS

Figure 1:
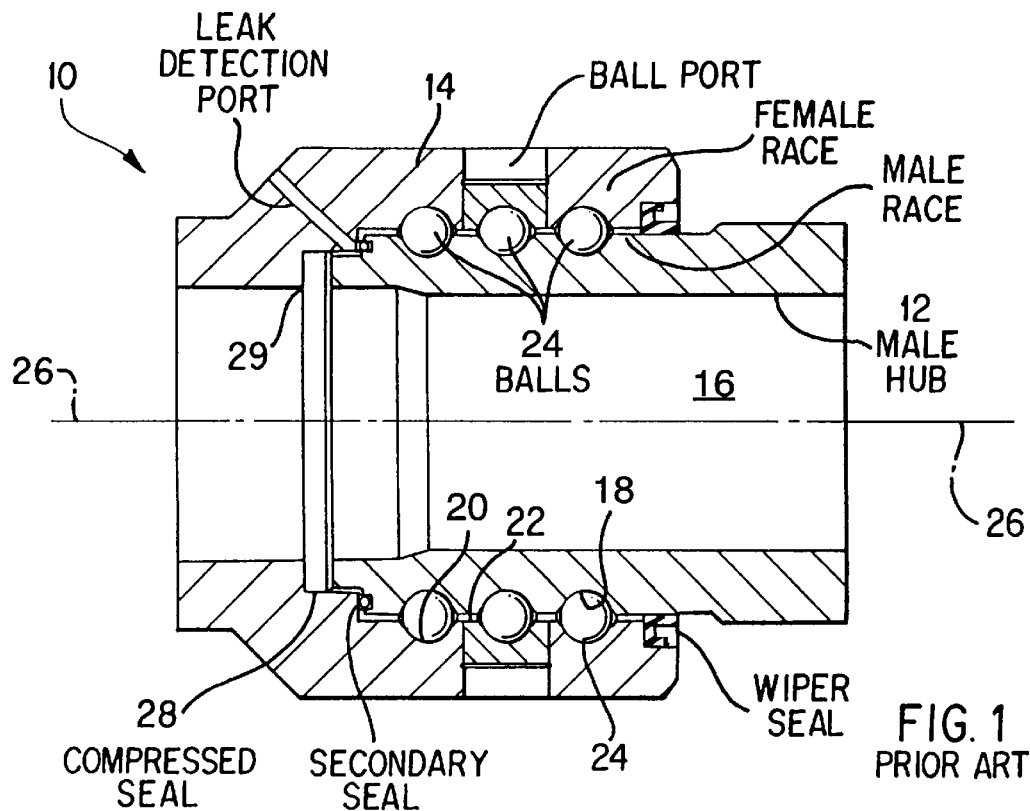
FIG. 1 is a partial cross section of a PRIOR ART triple-race swivel joint bearing assembly.

FIG. 1 shows a known, prior art swivel joint 10 having a male connector 12 rotatably received inside of a female connector 14. A sealed fluid flow passage 16 is formed therethrough, in communication with fluid conduits or pipes (not shown) extending from each connector. Each connector 12, 14 has respectively formed thereon a plurality of annular grooves 18,20. When the connectors 12 and 14 are inserted together, the grooves 18 and 20 align with each other forming annular bearing races 22. A plurality of ball bearings 24 are housed in each race 22 to provide bearing support and to enable swiveling of the connectors 12, 14 relative to each other. The races 22 and ball bearings 24 are coaxially positioned around a center axis 26 of the flow passage 16, The races 22 all have substantially the same radius. An annular elastomer compression seal 28 is positioned between axial faces of the male connector 12 and the female connector 14 to prevent fluid flow therebetween. The compression seal 28 is pre-stressed.

When fluid under pressure is introduced into the flow passage 16 there results a hydrostatic end load causing the male and female connectors 12, 14 to be biased axially away from each other. The ball bearings 24 are, then subject to axial resultant forces which are transmitted through contact surfaces between the ball bearings 24 and the races 22. The resultant force to which each bearing race 22 is subject is distributed in relation to the relative position of each race. For instance, the male member groove 18 closest to the seal 28 is subject to a first load, the second groove is subject to a second load which is cumulative of the first load, and so on. Thus, with each successive bearing race 22 moving away from the seal 28, the load on the male member groove 18 decreases. The female connector 14 is subject to analogous loading, with the race closest to the seal bearing the greatest load.

In a typical triple-race bearing assembly 10 as shown in FIG. 1, the load distribution for each race 22 beginning with that closest to the seal 28 is approximately 47%, 31% and 22%. It is desirable then to distribute the load more equally so as to reduce the load on the first race without reducing the overall load bearing capacity of the bearing assembly. The present invention accomplishes this through the stepped configuration.

Figure 2:
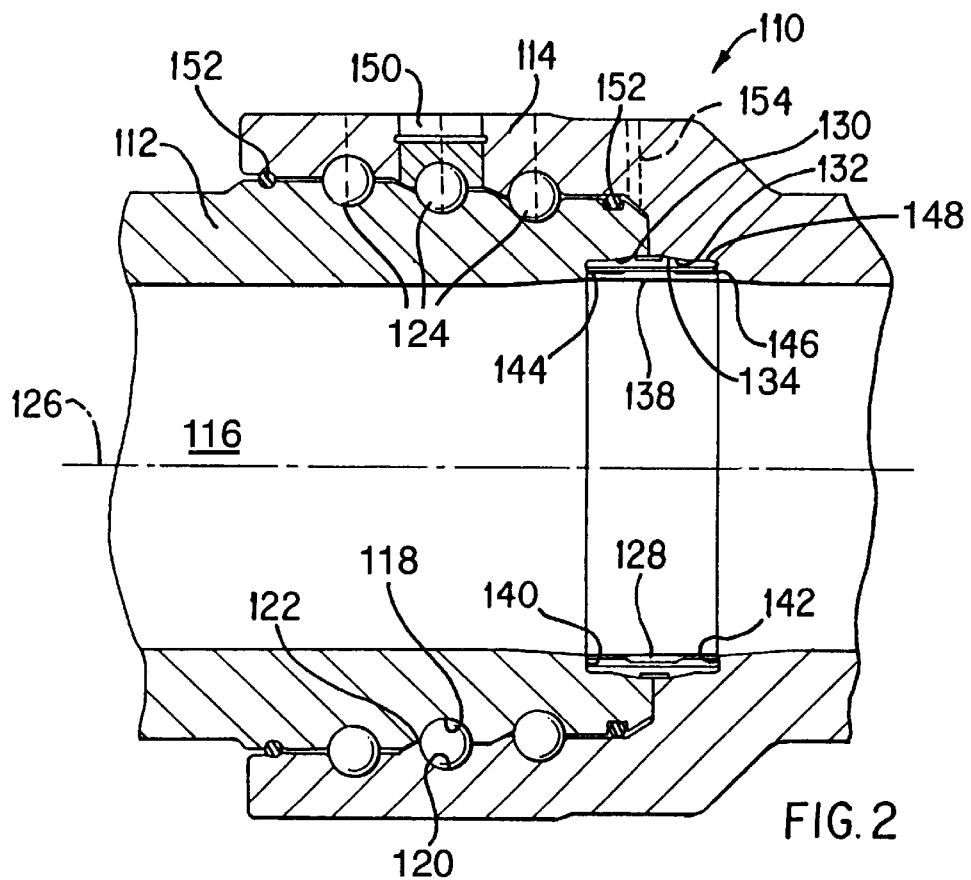
FIG. 2 is a partial cross-section of a first embodiment of the present invention having a stepped, triple-race bearing assembly and a straight bore seal.

The first embodiment of the present invention is shown in FIG. 2. A swivel joint 110 has a male connector 112 rotatably received inside of a female connector 114. A sealed fluid flow passage 116 is formed therethrough, in communication with fluid conduits or pipes (not shown) extending from each connector. Each connector 112, 114 has respectively formed thereon a plurality of annular grooves 118, 120. When the connectors 112 and 114 are inserted together, the grooves 118 and 120 align with each other forming annular bearing races 122. A plurality of ball bearings 124 are housed in each race 122 to provide bearing support and to enable swiveling of the connectors 112, 114 relative to each other. The races 122 and ball bearings 124 are coaxially positioned around a central axis 126 of the flow passage 116.

The present invention provides for a stepped arrangement wherein the radii of the consecutive bearing races 122 increase progressively in consecutive races 122 in a direction moving away from the male connector end which contacts the female connector 114. This stepped design more uniformly distributes loading per ball bearing 124 by more uniformly distributing tensile stress across each hub section at each respective race 122. The number of steps can vary from two or more and there can be one or more races per step. The lengths of race radii are determined as a function of the cross-sectional areas of the connector at each race location, end load, ball and race radius and other variables. The dimensions are calculated to divide the end load as nearly evenly as possible among each bearing race. It is desirable, though not required, that the ball bearings 124 are of uniform size throughout the assembly 110 and, thus, each race 122 will contain a different number of ball bearings 124.

The present invention utilizes a straight bore seal 128 of the type disclosed in U.S. Pat. No. 4,930,791 made of non-metallic compositions such as "TEFLON" having different properties than conventional elastomer compression seals such as the seal 28 of FIG. 1. Conventional elastomer seal materials have inherent limitations with respect to extrusion, fluid compatibility, temperature range, and rupture. The axial ends of the male and female connectors 112, 114 have recessed sections 130 and 132 respectively, which form one recessed groove 134 when the connectors 112, 114 are fitted together as shown in FIG. 2. The straight bore seal 128 is received therein such that the inner circumferential surface 138 of the seal 128 is flush with the inner surface of the flow passage 116. The recessed sections 130 and 132 have axial end portions 140 and 142 facing toward each other which receive the axial ends of the straight bore seal 128. The end portions 140 and 142 are engaged by axial ends 144 and 146 of the straight bore seal 128. The outer circumferential surface 148 forms a seal with the inner circumferential surface of the groove 134. Because the geometry and material of the straight bore seal 128 allows a substantially smaller cross-sectional area than a comparable capacity conventional elastomer seal 28, hydrostatic end loading and, thus, contact force between each ball bearing 124 and race 122 are reduced significantly resulting in less brinelling of the race 122. The assembly 110 embodied in FIG. 2 further includes a ball bearing port 150 and secondary elastomer O-ring or other suitable seals 152. A leak detection port 154 is also provided.

In order to further illustrate the novelty of the present invention, FIGS. 3A and 3B show juxtaposes the PRIOR ART assembly 10 of FIG. 1 with a second embodiment 210 of the present invention assembly along centerline 200. Because the straight bore seal 228 has a lower seal profile than the conventional seal 28, the sealing radius 256 of the present invention is smaller than the sealing radius 56 of the conventional seal 28. This results in a smaller area of the connectors subject to hydrostatic pressure and, thus, a reduced hydrostatic end load. While the conventional seal 28 is subject to pre-stress axial compression, the straight bore seal 228 is free of axial loading. Thus, friction forces between the connectors and the seal 228 are generally non-existent, while the conventional seal 28 contacts the female connector 14 on inner circumferential and axial surfaces and contacts the male connector 12 on an axial surface.

Figure 4A:
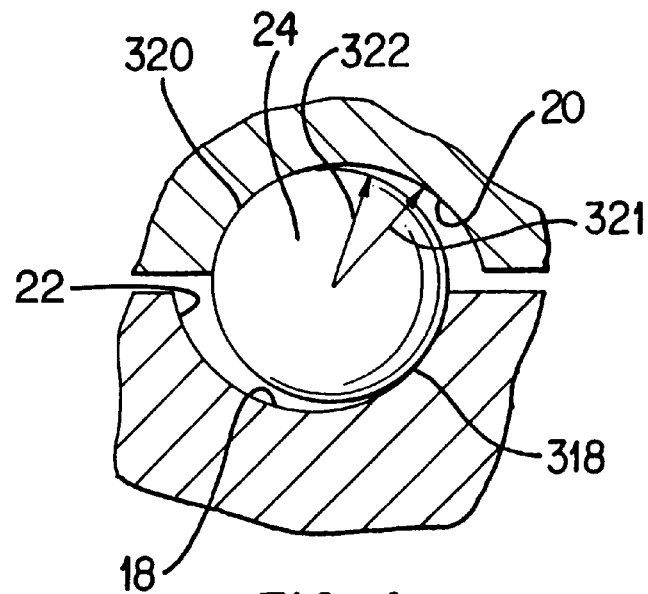
FIG. 4a is an enlarged, cross-section of a ball bearing in a PRIOR ART bearing race assembly.

FIG. 4a illustrates a conventional bearing arrangement subject to hydrostatic loading in which a ball bearing 24 is received in a race 22 formed by male and female connector grooves 18, 20. Typical bearing races such as the one illustrated in FIG. 4a are machined as grooves 18,20 having a constant radius 321. The groove radius 321 must be greater than the radius 322 of the ball bearings to the extent that assembly is possible. This results in concentrated contact areas 318,320 when connectors shift under axial load. Such load concentrations subject the races to brinelling.

Figure 4B:
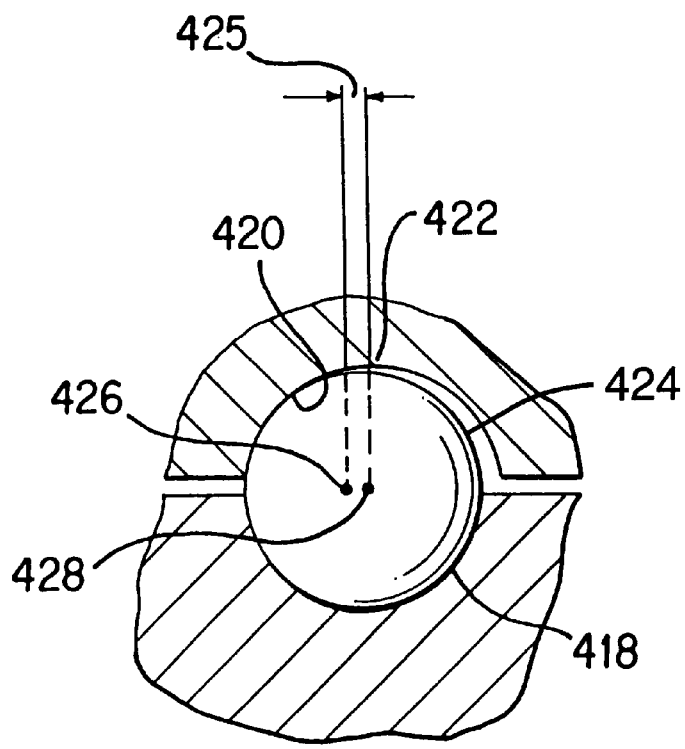
FIG. 4b is an enlarged, cross-section of a ball bearing in a bearing race assembly of the present invention.

In order to reduce concentration of contact areas as described above, the present invention provides grooves having offset radii as illustrated in FIG. 4b. As shown in FIG. 4b, the female connector groove 420 is formed with the substantially the same radius as the ball bearing 424 except that at the apex 422 of the groove 420 there is a straight line-portion 425 formed by offsetting the center point 426 of the radius of the groove 420 to an offset center point 428. Thus the groove 420 does not form, in profile, a perfect half-circle due to the straight-line portion 425 on the perimeter of the groove profile at the apex 422. The male connector groove 418 can be formed with substantially the same radius as the ball bearing 424. This design provides enough clearance to facilitate assembly while maximizing the contact areas between the ball bearing 424 and the respective grooves 418,420, thereby minimizing brinelling. Either connector groove for an individual race can have the offset radius feature, or both grooves can have a reduced offset distance.

FIG. 5 illustrates a third embodiment of the invention utilizing the stepped configuration illustrated in the embodiment of FIG. 2, having connectors 512,514 that are placed end to end and joined by a collar 513 which fits around the connectors 512,514. Each connector 512,514 has a plurality of stepped grooves 518,519 corresponding to a plurality of stepped grooves 520,521 in the collar 513. A single straight bore seal 538 is utilized. The embodiment herein operates essentially the same way and utilizes essentially the same features as the first embodiment described in FIG. 2.

Although the best mode contemplated for carrying out the invention has been herein shown and described, it is understood that modification and variation may be made without departing from what is regarded as the subject matter of the invention.

What is claimed is:

1. In combination with a swivel joint forming a flow passage and having a central axis, the improvement comprising:

a hollow tubular male connector having a first end, an annular outer surface and a plurality of outer annular grooves formed on said outer surface concentric with said central axis, wherein each said outer groove comprises a generally arcuate cross-section and a radius measured from said central axis, and wherein the radius of each said outer groove is greater than the radius of each adjacent outer groove closer to said first end;

a hollow tubular female connector having an annular recess adapted to receive and fit around said outer surface and a plurality of inner annular grooves formed on said annular recess concentric with said central axis, said recess forming a shoulder within said female connector adjacent said first end, wherein each said inner groove comprises a generally arcuate cross-section and a radius measured from said central axis, and wherein the radius of each said inner groove is greater than the radius of each adjacent inner groove closer to said shoulder, said inner grooves each corresponding to one of said outer grooves and forming therewith an arcuate race; and a plurality of ball bearings received in each race to secure said male and female connectors together and to facilitate relative rotation of said male and female connectors about said central axis; wherein the cross-section of at least each outer groove or each inner groove comprises first and second arcuate segments each having a distinct centerpoint and substantially the same radius; and wherein the centerpoint of the first segment is offset from the centerpoint of the second segment in a direction parallel to the central axis; and wherein the radius of the first and second segments is substantially the same as the radius of the ball bearings positioned in the race formed by the corresponding outer or inner groove.

2. A swivel joint according to claim 1, wherein:

said first end of said male connector comprises a recessed inner annular portion;

said female connector comprises a recessed inner annular portion adjacent to said male connector recessed inner annular portion when said male connector is received in said female connector, such that said recessed inner annular portions of said male and female connectors together form an inner annular seal groove; and said swivel joint further comprises an annular seal having an outer sealing surface received in said seal groove thereby sealing against the inner circumferential surfaces of said recessed inner annular portions of said male and female connectors, said seal having an inner surface generally flush with said flow passage.

3. A swivel joint according to claim 2, wherein said seal is made of a non-metallic material.

4. A swivel joint according to claim 3, wherein said seal is a radial compression fit seal.

5. A bearing assembly according to claim 1, wherein the cross-section further comprises a straight line segment connecting said first and second arcuate segments.

6. A bearing race assembly for use in a swivel joint comprising:

a pair of opposed tube-shaped connecting members each having a central axis coaxial with the other and each having a plurality of outer annular grooves, said members being positioned such that a first end of each is adjacent to the other, each groove having a generally arcuate cross-section and a radius measured from said central axis, wherein the radius of each said outer groove on a respective connecting member is greater than the radius of each adjacent outer groove closer to said first end on said respective connecting member;

a collar coaxially aligned with said connecting members and adapted to receive and fit around said connecting members, said collar having a plurality of inner annular grooves each having a generally arcuate cross-section and a radius measured from said central axis, wherein the radius of each said inner groove is greater than the radius of each adjacent inner groove closer to said first end of each said connecting member, said inner grooves each corresponding to one of said outer grooves and forming therewith an arcuate race; and a plurality of ball bearings received in each race to facilitate relative rotation of said connecting members and said collar about said central axis;

wherein the cross-section of at least each outer groove or each inner groove comprises first and second arcuate segments each having a distinct centerpoint and substantially the same radius; and wherein the centerpoint of the first segment is offset from the centerpoint of the second segment in a direction parallel to the central axis; and wherein the radius of the first and second segments is substantially corresponding outer or inner groove. the same as the radius of the ball bearings positioned in the race formed by the 7. A bearing race assembly according to claim 6, wherein each said connecting member and said collar has a central opening therethrough coaxially aligned about said central axis forming a fluid flow passage.

8. A bearing race assembly according to claim 7 wherein each said first end of said connecting members has a recessed inner annular portion such that said inner annular portions together form an inner annular seal groove;

an annular seal having an outer sealing surface is received in said seal bore thereby sealing against inner circumferential surfaces of said inner portions, said seal having an inner surface generally flush with said fluid flow passage.

9. A bearing race assembly according to claim 8, wherein said seal is made of a non-metallic material.

10. A bearing race assembly according to claim 9, wherein said seal is a radial compression fit seal.

11. A swivel joint comprising:

a central axis;

a hollow tubular male connector having an outer annular surface, a first end and at least first and second outer annular grooves formed on the outer surface concentric with the central axis;

a hollow tubular female connector having an inner annular recess forming an inner annular shoulder and at least first and second inner annular grooves formed on the inner recess concentric with the central axis;

wherein the inner recess is adapted to receive and overlap the outer surface such that the first end is adjacent the inner annular shoulder and each inner groove is in alignment with a corresponding outer groove to thereby define at least first and second arcuate races;

wherein the diameter of each arcuate race is greater than the diameter of each adjacent arcuate race closer to the first end of the male connector; and a plurality of ball bearings received in each race to secure said male and female connectors together and to facilitate relative rotation of the male and female connectors about the central axis;

wherein the male and female connectors form a flow passage of the swivel joint;

wherein the cross-section of at least each outer groove or each inner groove comprises first and second arcuate segments each having a distinct centerpoint and substantially the same radius; and wherein the centerpoint of the first segment is offset from the centerpoint of the second segment in a direction parallel to the central axis; and wherein the radius of the first and second segments is substantially the same as the radius of the ball bearings positioned in the race formed by the corresponding outer or inner groove.

12. A swivel joint according to claim 11, further comprising:

an annular seal positioned between the first end and the inner annular shoulder.

13. A swivel joint according to claim 11, further comprising:

a first recessed section formed in the male connector adjacent the first end and a second recessed section formed in the female connector adjacent the inner annular shoulder, the first and second recessed sections forming a recessed groove when the male connector is received in the female connector; and an annular seal positioned within the recessed groove.

14. A bearing assembly according to claim 6, wherein cross-section further comprises a straight line segment connecting said first and second arcuate segments.

15. A swivel joint according to claim 1, wherein the radii of the inner and outer grooves are determined as a function of the radius of the ball bearings and the cross sectional areas of the male and female connectors at at each race.

16. A bearing race assembly according to claim 6, wherein the radii of the inner and outer grooves are determined as a function of the radius of the ball bearings and the cross sectional areas of the male and female connectors at at each race.

17. A swivel joint according to claim 11, wherein the diameters of the races are determined as a function of the radius of the ball bearings and the cross sectional areas of the male and female connectors at at each race.

* * * * *